United States Patent [19]

Yang

[11] E Re. 28,566

[45] Reissued Oct. 7, 1975

[54] CLEANING APPARATUS

[75] Inventor: Frank Y. Yang, Hacienda Heights, Calif.

[73] Assignee: Xerox Corporation, Stamford, Conn.

[22] Filed: May 11, 1973

[21] Appl. No.: 378,850

Related U.S. Patent Documents

Reissue of:

[64] Patent No.: 3,580,673
Issued: May 25, 1971
Appl. No.: 755,266
Filed: Aug. 26, 1968

[52] U.S. Cl. ..... 355/15
[51] Int. Cl. ..... G03g 15/00
[58] Field of Search ..... 355/3, 15

[56] References Cited

UNITED STATES PATENTS

| | | | |
|---|---|---|---|
| 2,751,616 | 6/1956 | Turner | 15/77 |
| 2,752,271 | 6/1956 | Walkup | 355/15 X |
| 2,832,311 | 4/1958 | Byrne | 355/3 X |
| 2,911,330 | 11/1959 | Clark | 355/15 X |
| 2,956,487 | 10/1960 | Giaimo | 355/15 X |
| 3,438,706 | 4/1969 | Tanaka | 355/15 X |

*Primary Examiner*—Monroe H. Hayes

[57] ABSTRACT

A method and apparatus for cleaning the residual toner image from an electrostatic recording surface for reuse in the imaging system. This is accomplished by contacting the electrostatic recording surface to be cleaned with an electrically insulating magnetic cleaning material which is moved on a transport into sweeping contact with the residual image. An electrical potential is applied to the transport of opposite polarity to the residual image and of a magnitude sufficient to pull the residual image onto the magnetic cleaning material which wipes the residual image enabling mechanical as well as electrostatic forces to remove the residual image. The residual image is removed from the magnetic cleaning material by contacting it with an electrically biased member which is connected to a voltage potential of sufficient magnitude to remove the image from the cleaning material onto the surface of electrical biasing member ensuring continuous removal of the residual image for subsequent reuse in the imaging system.

18 Claims, 1 Drawing Figure

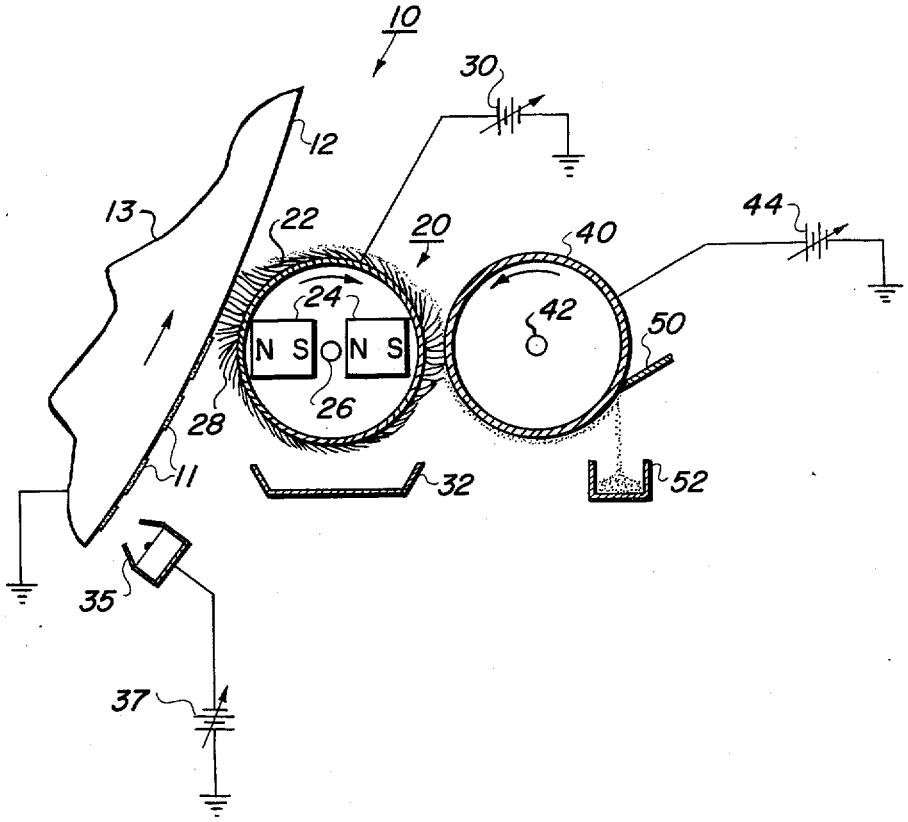
INVENTOR.
FRANK Y. YANG
BY Melvin A. Klein
ATTORNEY

CLEANING APPARATUS

Matter enclosed in heavy brackets [ ] appears in the original patent but forms no part of this reissue specification; matter printed in italics indicates the additions made by reissue.

---

This invention relates to electrostatic imaging systems and more particularly, to an improved apparatus for cleaning electrostatic recording surfaces.

The formation and development of images on the surface of recording materials by electrostatic means is well known. One basic process, as taught by Chester F. Carlson in U.S. Pat. No. 2,297,691, involved placing a uniform electrostatic charge on a photoconductive insulating layer, exposing the layer to a light-and-shadow image to dissipate the charge on the areas of the layer exposed to the light and developing the resulting latent electrostatic image by depositing on the image a finely divided electroscopic powder material referred to in the art as "toner." The toner is normally attracted to those areas of the layer which retain a charge, thereby forming a toner image corresponding to the latent electrostatic image. This powder image may then be transferred to a support surface such as paper. The transferred image may subsequently be permanently affixed to a support surface. After cleaning, the layer is ready for another imaging cycle.

As is well known in recent years, the steadily increasing size of various industries has required an enormous increase in the amount of paper work that must be accomplished, maintained and made available for wide interplant circulation. In the present day commercial automatic copiers/reproduction machines, the electrostatic recording surface is in the form of a drum of belt which moves at very high rates in timed unison relative to a plurality of processing stations. This rapid movement of the electrostatic recording surface has required vast amount of toner particles during development.

Associated with the increased amounts of toner is the difficulty in removing the residual image remaining on the recording surface after transfer. In the reproduction process, for example, of Chester F. Carlson, the residual image is tightly retained on the photoconductive surface by a phenomenon that is not fully understood but believed to be caused by an electrical charge and Van der Waals forces that prevent complete transfer of the toner to the support surface, particularly in the image area. This residual toner image is normally removed by a "brush" type cleaning apparatus or "web" type cleaning apparatus. A typical brush cleaning apparatus is disclosed in U.S. Pat. No. 2,832,977 to L. E. Walkup et al., and in U.S. Pat. No. 2,911,330 to H. E. Clark. The brush cleaning apparatus usually comprises one or more rotating brushes which brush residual toner from the recording surface into a stream of air which is exhausted through a filtering system. A typical web cleaning apparatus is disclosed in U.S. Pat. No. 3,186,838, to W. P. Graff et al.

While ordinarily capable of cleaning electrostatic recording surfaces, conventional cleaning devices have not been entirely satisfactory. Most of the known cleaning devices usually become less efficient as they become contaminated with toner which cannot be removed necessitating frequent replacement of the cleaning device. As a result, valuable time is lost during "down time"while a change is being made. A further problem is that cleaning devices employed in current commercial copier/duplicator machines permanently remove residual toner particles from the system. Since toner is an expensive consumable, permanent removal of the residual toner particles from the system during cleaning is undesirable because it adds to the cost of machine operation. Both the web and brush cleaning units normally do not enable residual toner particles to be reusable as developer after the cleaning operation. This is due to the collection of lint from the web or brush in the toner and physical and chemical changes to the toner caused by heat generated during the cleaning operation. In addition, an elaborate and noisy vacuum and filtering system is necessary with the brush cleaning device to collect the residual toner particles removed by the brush. It has been found that large amounts of toner particles thrown into the air by the rapidly rotating brush device often drift from the brush housing blown by the vacuum fan to form unwanted deposits on critical machine parts.

While the web cleaning apparatus has some advantages it is difficult to align with the surface of the electrostatic recording surface and uneven contact between the web and the surface as well as uneven takeup of the web on a takeup roll is often encountered even with complex alignment apparatus. Another problem with the web apparatus is that pressure contact between cleaning webs and some imaging surfaces must be kept to a minimum to prevent destruction of the imaging surface. Thus, there is a continuing need for a better system for cleaning electrostatic recording surfaces.

It is therefore, an object of this invention to provide method and apparatus for cleaning electrostatic imaging surfaces which overcome the above-noted deficiencies.

It is another object of this invention to improve the quality of prints produced by electrostatic copier/duplicator machines.

It is a further object of this invention to reduce toner consumption in automatic electrostatic imaging machines.

It is also an object of this invention to utilize cleaning apparatus in reproduction equipment which does not require extensive alignment or adjustment.

It is still another object of this invention ro remove residual toner which is immediately reuseable in an electrostatic imaging system.

It is a further object of this invention to provide simple, inexpensive and reusable apparatus for cleaning electrostatic recording surfaces.

It is a still further object of this invention to provide cleaning apparatus for an electrostatic imaging system which is more efficient than existing cleaning devices.

It is still a further object of this invention to prevent power cloud formation at the cleaning station of copier/duplicator machines.

It is still a further object of this invention to reduce the noise level of copier/duplicator machines.

These and other objects of the invention are attained generally speaking by transporting magnetic beads in sweeping contact with the electrostatic recording surface to be cleaned mechanically loosen the toner particles from the surface. At the same time, an electrical bias of a polarity opposite that of the toner particles and of sufficient magnitude is applied to pull the toner from the surface onto the magnetic beads thereby removing substantially all of the toner from the surface. The magnetic beads are advanced past an electrically biased means having a potential sufficiently high to remove the toner thereby freeing the magnetic beads of the residual toner so that continuous cleaning action is obtained.

For a better understanding of the invention as well as other objects and further features thereof, reference is had to the detailed description of the invention to be read in connection with the accompanying drawing, the single FIGURE of which is a partly schematic, cross-sectional side elevational view of cleaning apparatus according to one embodiment of the present invention.

Referring now to the drawing, there is shown the cleaning apparatus 10 for cleaning an electrostatic residual image 11 made up of charged electroscopic toner particles on the outer surface 12 of an electrostatic recording element 13. Recording element 13 may comprise a photoconductive layer on a suitable backing sheet and an electrostatic latent image may be formed and developed on the recording element 13 by any means known in the art. An example of a typical recording element and means for producing and developing an electrostatic image thereon is described in U.S. Pat. No. 3,301,126 to Osborne et al. issued on Jan. 31, 1967. For positive to positive reproduction, a negatively charged toner is used, whereas in a negative to positive reproduction, a positively charged toner is used. The cleaning apparatus of this invention is adapted to remove the residual toner material in such a manner that it can be reused with the developer material and at the same time be effective for continuous cleaning whereby replacement of the cleaning apparatus is not a concern.

Cleaning apparatus 10 comprises a magnetic transport assembly generally designated 20 which includes a cylindrical member 22 which houses one or more fixed permanent bar magnets 24. Cylindrical member 22 is made out of any suitable nonmagnetic material and is mounted for rotation on a shaft 26 which is driven in the direction indicated by the arrow by any suitable drive means not shown at about two to four times the drum speed. Typical nonmagnetic materials comprise glass or any of the nonmagnetic metals such as brass, aluminum or copper and mixtures thereof.

Arranged on the periphery of cylindrical member 22 is magnetic cleaning material 28 which comprises magnetic beads which can be uncoated or coated as will be explained more fully hereinafter. It will be appreciated that streamers are formed from the outer surface of cylinder 22 due to the lines of force from magnets 24 which are oriented in polar paths as indicated by the letters N and S, which illustrate north and south poles, respectively. The magnetic beads comprise any suitable material. The magnetic material may be "soft," i.e., retaining very little residual magnetism, or the permanent magnet type. Typical magnetic materials comprises powdered iron including types known commercially as alcoholized iron and carboxal iron, steel, nickel, alloys of magnetic iron, such as nickel-iron alloys, nickel-cobalt-iron alloys, and magnetic oxides, such as, iron oxide, hematite ($Fe_2O_3$) and magnetite ($Fe_3O_4$) and magnetic ferrites. Desirably, the magnetic particles are of a size larger than about 100 mesh and preferably between 20 and about 60 mesh for efficient cleaning. The particles can be supplied from any suitable source such as a tray 32.

To effect removal of the residual image onto the magnetic cleaning material the cylindrical member 22 has a variable source of DC potential 30 connected to it to exert electrostatic attraction on the toner on the drum surface. The source of potential desirably ranges from about 200 volts to about 1000 volts and is of the polarity opposite to the toner particles which, for example, for negative charged toner, would be a positive potential. Desirably the cylindrical member has an electrical insulating layer which may be made of any suitable semiconductive material. Alternatively the magnetic beads can be coated with an electrically insulating material. Typical coating materials are described in U.S. Pat. No. 2,618,551 to Walkup, U.S. Pat. No. 2,618,552 to Wise, I.S. Pat. No. Re. 25,136 to Carlson and U.S. Pat. No. 2,874,063 to Greig. The materials disclosed in these patents as well as many of the magnetic materials mentioned above, also have a triboelectric attracting for the toner particles which serves to further facilitate removal of the toner particles onto the beads.

In order to further enhance the electrostatic attraction of the toner particles onto the magnetic cleaning beads, a corona generating device 35 is positioned in the path of the recording element 13 just prior of the magnetic transport assembly 20 to place a charge on the toner particles of the same polarity as the particles which in this case would be negative. This charge desirably reduces that attraction of the toner particles to the surface of the recording element and ensures that the toner particles are properly negatively charged so that they will be attracted to the positive potential applied by DC potential 30. It has been found that a current ranging from about 2 to about 10 microamps for the corona device is sufficient for this purpose. Corona device 35 is suitably powered as by a variable source of DC potential 37.

It will be appreciated that as cylindrical member 22 is rotated about its shaft, streamers or bristles formed by the magnetic cleaning material due to the orientation of the poles on the magnet members 24 sweep past drum surface 12 to mechanically and electrostatically as well as triboelectrically remove toner from the surface and onto the magnetic cleaning material 22. It should be noted that the bristles of cleaning material are most erect at the drum surface 22 to obtain good wiping action.

With the residual image being removed from drum surface 12 and onto magnetic cleaning material, it is essential that these toner particles in turn be removed from the magnetic cleaning material to prevent them from redepositing onto the drum surface. To this end, a bias roll member 40 is positioned in surface contact with the magnetic cleaning material and adapted for rotation on a shaft 42 driven at approximately the same speed in the opposite direction whereby toner material is continuously removed from the magnetic cleaning material onto the bias roll member. In order to accomplish this, the bias roll member is made out of a conductive material and is connected to a source of DC potential 44 which is sufficiently high so as to electrostatically remove the toner material from the magnetic transport and deposit it onto the roll member. DC potential 44 ranging from about 1,000 volts to about 2,000 volts of the same polarity as potential source 30 is found to perform well for this purpose. A wiper element 50 is positioned in contact with the bias roll member 40 as to continuously scrape the toner material from the bias roll thereby depositing the toner material into a catch tray 52 for subsequent reuse in the development system of the copying machine. Any suitable metallic or nonmetallic material may be used for the scraper blade.

In operation, the magnetic transport assembly forms bristles of cleaning beads which are erect to the electrostatic recording surface to mechanically loosen to toner which is then electrostatically pulled from the surface by a potential of opposite polarity and very high magnitude applied to the surface of the transport assembly. The precleaning corona charge on the toner and triboelectric properties of the magnetic cleaning beads further enhance removal of the toner. As the magnetic transport assembly continues to rotate, the magnetic cleaning beads collapse according to the lines of the magnetic force emanating from the magnets 24 and then reform in erect bristle formation again adjacent the bias roll member 40 of the three o'clock position where the toner is redeposited onto the bias roll member so as to purge the toner from the cleaning material enabling the beads to be utilized at full strength continuously. The toner removed onto the bias roll member is deposited into catch tray 52 where it is available for reuse in the development system of the imaging system.

Described above is the new and unique cleaning apparatus for continuously removing the residual image from an electrostatic recording surface. The cleaning apparatus described enables the toner removed from the electrostatic recording surface to be reused in the developer unit of the system since it is recovered in substantially the same form that it is used during development.

In the past, toner recovered from the residual image has not been reusable due to impurities from lint as well as deformation due to heat generated at the cleaning station. Moreover, the cleaning apparatus of the invention is reusable and is not apt to be replaced periodically as in the case of the existing cleaning devices. While extraordinarily simple in operation, the cleaning apparatus of the invention provides a very efficient cleaning operation that is highly desirable for producing high quality prints in automatic copying machines producing copies at very high rates.

This application specifically describes one form which the invention may assume in practice. It will be understood that this form is the same as shown for purposes of illustration and that the invention may be modified and embodied in various other forms without departing from the cope of the appended claims.

I claim:

1. Cleaning apparatus for removing electrostatically adhering toner particles from an electrostatic recording surface for reuse in an electrostatic copying system comprising transport means for transporting cleaning beads in sweeping contact with an electrostatic recording surface from which electrostatically adhering toner particles are to be removed, said transport means being connected to an electrical biasing potential of a polarity opposite that of the toner particles and of a magnitude sufficient to remove the particles from the recording surface and onto the cleaning beads, roll positioned in the path of said transport means coupled to an electrical biasing potential of a polarity opposite that of said toner particles and of a magnitude sufficient to attract said toner particles from said cleaning beads onto the surface thereof whereby the cleaning beads present continuous cleaning surfaces, and means for wiping the electrostatically adhering toner particles from the surface of said roll means into a collection receptacle.

2. Apparatus according to claim 1 including corona generating means or applying a charge of the same polarity as said toner particles to said recording surface before said toner particles are contacted by said cleaning beads.

3. Apparatus according to claim 1 wherein the electrical biasing potential connected to said transport means ranges from about 200 to 1,000 volts and the electrical biasing potential connected to said roll means ranges from about 1,000 to 2,000 volts.

4. Apparatus according to claim 1 wherein said cleaning beads are made of magnetizable material and said transport means comprises a cylindrical member adapted for rotation past at least one fixed magnet member having polar orientation to produce radial lines of flux adjacent the electrostatic recording surface and said roll means.

5. Apparatus according to claim 4 including corona generating means for applying a charge of the same polarity as said toner particles to said recording surface before said toner particles are contacted by said cleaning beads.

6. Apparatus according to claim 4 wherein the electrical biasing potential connecting to said transport means ranges from about 200 to 1,000 volts and the electrical biasing potential connected to said roll means ranges from about 1,000 to about 2,000 volts.

7. In an automatic electrostatic copying machine in which an electrostatic recording surface is moved past a series of processing stations including a development station at which an electrostatic latent image is developed by electroscopic toner particles and a transfer station at which the toner particles are transferred to a support sheet, an improvement for removing a residual image from the electrostatic recording surface for use in the copying machine comprising transport means for transporting cleaning beads in sweeping contact with an electrostatic recording surface from which electrostatically adhering toner particles are to be removed, said transport means being connected to an electrical biasing potential of a polarity opposite that of the toner particles and of a magnitude sufficient to remove the particles from the recording surface and onto the cleaning beads, roll means positioned in the path of said transport means and coupled to an electrical biasing potential of a polarity opposite that of said toner particles and of a magnitude sufficient to attract said toner particles from said cleaning beads onto the surface thereof whereby the cleaning beads present continuous cleaning surfaces, and means for wiping the electrostatically adhering toner particles for the surface of said roll means into a collection receptacle.

8. Apparatus according to claim 7 including corona generating means for applying a charge of the same polarity as said toner particles to said recording surface before said toner particles are contacted by said cleaning beads.

9. Apparatus according to claim 7 wherein the electrical biasing potential connected to said transport means ranges from about 200 to 1,000 volts and the electrical biasing potential connected to said roll means ranges from about 1,000 to about 2,000 volts.

10. A method of removing and recovering a residual image form an electrostatic recording surface in an electrostatic copying system comprising the steps of presenting magnetizable beads in bristle formation on a moving magnetic transport to the recording surface from which the residual image is to be removed, applying an electrical biasing potential of a polarity opposite that of the residual image and of sufficient magnitude to the transport while the magnetizable beads are in contact with said residual image to mechanically and electrostatically remove the residual image from the surface onto the beads, and then continuously recovering the residual image in reusable form from the beads by applying an electrical biasing potential to a member positioned in the path of the magnetic transport of a magnitude sufficient to remove the residual image from the beads onto the surface of the member.

11. The method according claim 10 wherein said cleaning beads comprise a magnetizable component covered with an electrically insulating material.

12. The method according to claim 10 wherein the surface of said transport is coated with an electrically insulating material.

13. The method according to claim 10 wherein said beads are made of a material having a triboelectric affinity for the image being removed.

14. The method according to claim 10 wherein the step of recovering the residual image in reusable form from the beads includes applying an electrical biasing potential to a moving member positioned in the path of the magnetic transport of a magnitude sufficient to remove the residual image from the beads onto the surface of the member and then wiping the residual image from the surface of the member.

*15. Apparatus for removing electrostatically adhering toner particles from an electrostatic recording surface comprising:*

*transport means, said transport means being connected to an electrical biasing potential of a polarity opposite that of the toner particles and of a magnitude sufficient to remove toner particles from the recording surface, beads having a triboelectric attraction for the toner particles, said beads being carried by said transport means into sweeping contact with an electrostatic recording surface from which toner particles are to be removed to remove toner particles therefrom onto the beads,*

*rotatable toner removal means positioned in the path of said transport means coupled to an electrical biasing potential of a polarity opposite that of said toner particles and of a magnitude sufficient to continuously attract said toner particles from said beads onto the surface thereof,*

*means for removing the electrostatically adhering toner particles from the surface of said toner removal means, and means for receiving the toner removed from the surface of said toner removal means.*

*16. The apparatus as recited in claim 15 wherein said apparatus is a cleaning apparatus for removing the residual image on the recording surface.*

*17. A method of removing and recovering toner particles from an electrostatic recording surface in an electrostatic copying system comprising the steps of:*

*presenting beads, having triboelectric attraction for the toner particles, in bristle formation on a moving transport to the recording surface from which the toner particles are to be removed, applying to the transport an electrical biasing potential of a polarity opposite that of the toner particles sufficient to remove toner particles from the recording surface while the beads are in contact with the toner particles, electrostatically, mechanically and triboelectrically removing the toner particles from the recording surface onto the beads, and then continuously recovering the toner particles in reusable form from the beads by applying an electrical biasing potential to a member positioned in the path of the transport of a magnitude sufficient to remove the toner particles from the beads onto the surface of the member.*

*18. The method as recited in claim 17 wherein said toner particles are a residual image.*

* * * * *